US006972821B2

(12) United States Patent
Yasuda et al.

(10) Patent No.: US 6,972,821 B2
(45) Date of Patent: Dec. 6, 2005

(54) ACTIVE-MATRIX ADDRESSING LIQUID-CRYSTAL DISPLAY DEVICE AND METHOD OF FABRICATING SAME

(75) Inventors: Kyounei Yasuda, Tokyo (JP); Satoshi Ihida, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/144,630

(22) Filed: May 13, 2002

(65) Prior Publication Data

US 2002/0167636 A1 Nov. 14, 2002

(30) Foreign Application Priority Data

May 14, 2001 (JP) ...................................... 2001-142713

(51) Int. Cl.[7] ........................ G02F 1/1339; G02F 1/136
(52) U.S. Cl. ......................................... 349/155; 349/43
(58) Field of Search ................................ 349/155, 122, 349/42, 43, 113

(56) References Cited

U.S. PATENT DOCUMENTS 5,905,548 A * 5/1999 Shimada ...................... 349/38
6,407,784 B1 * 6/2002 Kanou et al. ............... 349/113
6,414,739 B2 * 7/2002 Suzuki ....................... 349/155

FOREIGN PATENT DOCUMENTS

| | | | |
|---|---|---|---|
| JP | 63-221322 | 9/1988 | G02F/1/133 |
| JP | 2000-258800 | 9/2000 | G02F/1/136 |

* cited by examiner

*Primary Examiner*—Toan Ton
(74) *Attorney, Agent, or Firm*—Hayes Soloway P.C.

(57) ABSTRACT

An active-matrix addressing LCD device that suppresses effectively the off leakage current induced by the charge-up of the spacers placed over the TFTs. The device comprises (a) a first substrate having switching elements; (b) a second substrate coupled with the first substrate in such a way as to form a gap with spacers between the first and second substrates; the spacers being distributed in the gap; (c) a liquid crystal confined in the gap; and (d) protrusions formed in overlapping areas with the switching elements; each of the protrusions being protruded in a direction that narrows the gap. The spacers distributed in the gap are likely to be shifted away from the overlapping areas due to the protrusions.

14 Claims, 14 Drawing Sheets

ACTIVE-MATRIX ADDRESSING LIQUID-CRYSTAL DISPLAY DEVICE AND METHOD OF FABRICATING SAME

BACKGROUND OF THE INVENTION

1. Field of the Invention

The present invention relates generally to an active-matrix type Liquid-Crystal Display (LCD) device. More particularly, the invention relates to an active-matrix addressing LCD device that makes it possible to reduce the off-leak current of Thin-Film Transistors (TFTs) formed on the device, and a method of fabricating the same.

2. Description of the Related Art

In recent years, various types of LCD device with TFTs as switching elements have been developed, a typical one of which is the active-matrix addressing LCD device. Usually, the active-matrix addressing LCD device comprises an active-matrix substrate including TFTs, pixel electrodes, gate lines, drain lines, and so on; an opposite substrate including a color filter, a black matrix, and so on; and a liquid crystal layer sandwiched by these two substrates. On operation, a proper voltage is applied across the electrodes provided on the active-matrix substrate and those provided on the opposite substrate. Alternately, it is applied across a set of electrodes provided on the active-matrix substrate and another set of electrodes provided on the same substrate. Thus, the orientation of the liquid-crystal molecules is controlled (i.e., changed or rotated) to change the transmission quantity of light in every pixel, thereby displaying desired images on the screen of the device.

Regarding the TFTs, the staggered type and the inverted staggered type have been known. The staggered type TFT comprises a semiconductor island formed on the active matrix substrate, a gate electrode formed over the semiconductor island, and source and drain electrodes formed under the island. On the other hand, the inverted-staggered type TFT comprises a semiconductor island formed on the active-matrix substrate, a gate electrode formed under the semiconductor island, and source and drain electrodes formed over the island. Conventionally, the inverted-staggered type TFT has been used extensively.

A typical configuration of the prior-art active-matrix addressing LCD devices is shown in FIG. 1. Needless to say, this device includes a lot of inverted-staggered type TFTs, spacers, and pixels. However, for the sake of simplification, one TFT, one spacer, and one pixel are shown in FIG. 1 and explained mainly below.

With the prior-art active-matrix addressing LCD device of FIG. 1, an active-matrix substrate S101 comprises a glass plate 101, a gate electrode 102*a,* agate dielectric layer 103, an amorphous silicon (which is abbreviated to "a-Si" hereinafter) island 104*a,* a $n^+$-type a-Si layer 104*b,* a drain electrode 105*a,* and a source electrode 105*b*. The gate electrode 102*a,* the gate dielectric layer 103, the a-Si island 104*a,* the $n^+$-type a-Si layer 104*b,* and the drain and source electrodes 105*a* and 105*b* constitute each TFT 104.

The gate electrode 102*a* is formed on the surface of the plate 101. The gate dielectric layer 103 is formed on the surface of the plate 101 to cover the electrode 102*a*. The a-Si island 104*a* is formed on the gate dielectric layer 103 to overlap entirely with the gate electrode 102*a*. The $n^+$-type a-Si layer 104*b* is formed selectively on the island 104*a*. The drain electrode 105*a* and the source electrode 105*b* are formed on the gate dielectric layer 103 at each side of the island 104*a*. The inner end part of the drain electrode 105*a* is located on the a-Si layer 104*b* and contacted with the island 104*a* and the layer 104*b*. The inner end part of the source electrode 105*b* is located on the a-Si layer 104*b* and contacted with the island 104*a* and the layer 104*b*. The island 104*a* and the layer 104*b* are selectively etched to form a recess in the island 104*a*. A channel region is formed in the island 104*a* between the drain and source electrodes 104*a* and 104*b*.

The active-matrix substrate S101 further comprises an interlayer dielectric layer 107 formed to cover the TFT 104. The surface of the layer 107 is planarized. The layer 107 is selectively removed to form a contact hole 107*a* that exposes the source electrode 105*b*. A pixel electrode 108, which is formed by patterning a transparent, conductive film such as an Indium Tin Oxide (ITO) film, is formed on the layer 107. The electrode 108 is contacted with the source electrode 106 by way of the hole 107*a* at a contact region 106.

An orientation layer 109*a* is formed on the interlayer dielectric layer 107 to cover the exposed pixel electrode 108. The layer 109*a* serves to align the orientation of the liquid-crystal molecules existing in the liquid-crystal layer in a specific direction.

An opposite substrate S102 comprises a glass plate 111, a color filter 112*a,* a black matrix 112*b,* an overcoat layer 113, a transparent common electrode 114, and an orientation layer 109*b*. The color filter 112*a* and the black matrix 112*b* are formed on the surface of the plate 111. The overcoat layer 113 is formed to cover entirely the color filter 112*a* and he black matrix 122*b*. The common electrode 114 is formed on the layer 113. The orientation layer 109*b* is formed on the electrode 114 The layer 109*b* serves to align the orientation of the liquid-crystal molecules existing in the liquid-crystal layer in a specific direction.

The active-matrix substrate S101 and the opposite substrate S102 are coupled with each other with a sealing member (not shown) in such a way as to form a gap 130 between the substrate S101 and S102 with ball-shaped, rigid spacers 110. A specific liquid crystal is filled into the gap 130 to thereby form the liquid crystal layer.

With the prior-art LCD device shown in FIG. 1, as described above, the ball-shaped spacers 110 are distributed randomly in the gap 130 between the substrates S101 and S102 to ensure a uniformized one. Generally, the inner surface of the active-matrix substrate S101 is planarized with the use of the interlayer dielectric layer 107 while the inner surface of the opposite substrate S102 is planarized with the overcoat layer 113. Therefore, the positions of the spacers 110 are unable to be regularized or adjusted when coupling the substrates S101 and S102. Therefore, if one of the spacers 110 is located right over one of the TFTs 104, the spacer 110 is likely to be electrically charged up, thereby inducing an off leakage current flowing through the back channel section of the TFT 104 in question. The off leakage current will cause malfunction of the said TFT 104 to result in defective display operation.

To suppress effectively the off leakage current induced by the charge-up of the spacer 110, an improvement to displace the spacers 110 from the positions right over the TFTs 104 was created, which is disclosed in the Japanese Non-Examined Patent Publication No. 63-221322 published in 1988.

FIGS. 2A and 2B show a fabrication method of a prior-art active-matrix addressing LCD device to realize the improvement disclosed in the Publication No. 63-221322, respectively.

As shown in FIG. 2A, a gate electrode 202*a* is formed on the surface of a glass plate 201, where the electrode 202*a* has a two-layer structure of a chromium (Cr) layer and a molybdenum (Mo) layer. A gate dielectric layer 203 is formed on the surface of the plate 201 to cover the electrode 202*a*. An a-Si island 204*a* is formed on the gate dielectric layer 203 to overlap entirely with the gate electrode 202*a*. A $n^+$-type a-Si layer 204*b* is formed selectively on the island 204*a*. A drain electrode 205*a* and a source electrode 205*b* are formed on the layer 204*b* to be apart from each other at each side of the island 204*a*. The drain and source electrodes 205*a* and 205*b* are contacted with the layer 203 at only their ends. Each of the drain and source electrodes 205*a* and 205*b* has a two-layer structure of a Cr layer and an aluminum (Al) layer. The gate electrode 202*a*, the gate dielectric layer 203, the a-Si island 204*a*, the a-Si layer 204*b*, and the drain and source electrodes 205*a* and 205*b* constitute a TFT 204. A channel region is formed in the island 204*a* between the drain and source electrodes 204*a* and 204*b*.

Thereafter, an interlayer dielectric layer 207 is formed to cover the TFT 204. The surface of the layer 207 is not planarized. A light-blocking layer 221 for preventing external light from entering the channel region is selectively formed on the layer 207 in such a way as to entirely overlap with the channel region of the TFT 204. The layer 221 is typically made of Cr.

Subsequently, a photosensitive orientation layer 209*a* is formed on the interlayer dielectric layer 207 and at the same time, ball-shaped spacers 210 are dispersed on the layer 209*a*. Using a photomask 220 with a transparent area 220*a* located right over the TFT 204, the layer 209*a* is exposed to specific exposure light and developed, as shown in FIG. 2A. Thus, the layer 209*a* is selectively removed at the position right over the TFT 204. In this step, the spacers 210 existing over the TFT 204 are removed along with the removed part of the layer 209*a*. As a result, an active-matrix substrate S201 as shown in FIG. 2B is fabricated.

With the improvement disclosed in the Publication No. 63-221322, as shown in FIGS. 2A and 2B, the photosensitive orientation layer 209*a* is formed on the interlayer dielectric layer 207 and at the same time, the spacers 210 are dispersed on the layer 209*a*. Thereafter, the layer 209*a* is selectively exposed and developed, thereby selectively removing the layer 209*a* and the spacers 210 at the positions right over the TFT 204. As a result, the off leakage current induced by the charge-up of the spacers 110 is effectively suppressed while keeping the gap between the active-matrix substrate S201 and the opposite substrate (not shown) at a desired value.

However, with the improvement disclosed in the Publication No. 63-221322, the orientation layer 209*a* is partially removed and therefore, there arises a problem than the orientation of the liquid-crystal molecules is unable to be controlled as desired at the respective positions. If a light-blocking layer is additionally formed to cover these orientation-uncontrollable positions, there arises another problem of decrease in aperture ratio.

The Japanese Non-Examined Patent Publication No. 2000-258800 published in 2000 discloses a method of controlling the location of ball-shaped spacers, which does not intend to suppress the off leakage current in the back channel section. This method is explained below with reference to FIG. 3.

As shown in FIG. 3, an active-matrix-substrate S301 comprises a glass plate 301, and a gaze electrode 302*a* formed on the surface of the plate 301. A gate dielectric layer 303 is formed on the surface of the plate 301 to cover the electrode 302*a*. An a-Si island 304*a* is formed on the gate dielectric layer 303 to overlap entirely with the gate electrode 302*a*. A drain electrode 305*a* and a source electrode 305*b* are formed on the layer 303 to be apart from each other at each side of the island 304*a*. The inner end portion of the drain electrode 305*a* is contacted with the island 304*a*. The inner end portion of the source electrode 305*b* is contacted with the island 304*a*. The gate electrode 302*a*, the gate dielectric layer 303, the a-Si island 304*a*, and the drain and source electrodes 305*a* and 305*b* constitute a TFT 304, A channel region is formed in the island 304*a* between the drain and source electrodes 304*a* and 304*b*.

An interlayer dielectric layer 307 is formed to cover the TFT 304. The surface of the layer 307 is not planarized. A protrusion 322 is formed on the layer 307 in the vicinity of each TFT 304. The protrusion 322 has a rectangular cross section.

An opposite substrate S302 has the same structure as the opposite structure S101 shown in FIG. 1. Specifically, the substrate S302 comprises a glass plate 311, a color filter 312*a*, a black matrix 312*b*, an overcoat layer 313, a transparent common electrode 314, and an orientation layer 309*b*.

A gap 330 is formed between the coupled substrates S301 and S302. Ball-shaped spacers 310 are dispersed in the gap 330.

With the prior-art LCD device shown in FIG. 3, the protrusions 322 are additionally provided near the respective TFTs 304 and therefore, the spacers 310 are prevented from entering the light-transmission regions due to vibration and/or shock. Thus, external-light leakage is suppressed to improve the display quality. However, this method is unable to prevent the spacers 310 from being placed right over the TFTs 304. Rather, the spacers 310 placed right over the TFTs 314 are difficult to go away from the TFTs 314.

SUMMARY OF THE INVENTION

Accordingly, a chief object of the present invention is to provide an active-matrix addressing LCD device that suppresses effectively the off leakage current induced by the charge-up of the spacers placed over the TFTs, and a method of fabricating the device.

Another object of the present invention is to provide an active-matrix addressing LCD device that suppresses effectively the defective sustainment of voltage at the pixel electrodes, and a method of fabricating the device.

Still another object of the present invention is to provide an active-matrix addressing LCD device that prevents the spacers from moving toward the switching elements due to vibration and/or shock, and a method of fabricating the device.

The above objects together with others not specifically mentioned will become clear to those skilled in the art from the following description.

According to a first aspect of the invention, an active-matrix addressing LCD device is provided, which comprises:

(a) a first substrate having switching elements;

(b) a second substrate coupled with the first substrate in such a way as to form a gap with spacers between the first and second substrates;

the spacers being distributed in the gap;

(c) a liquid crystal confined in the gap; and (d) protrusions formed in overlapping areas with the switching elements;

each of the protrusions being protruded in a direction that narrows the gap.

With the active-matrix addressing LCD device according to the first aspect of the invention, the protrusions are formed in the overlapping areas with the switching elements, each of the protrusions being protruded in a direction that narrows the gap.

Therefore, when or after the first and second substrates are coupled with each other to form the gap therebetween, the spacers distributed in the gap are shifted away from the overlapping areas. This means that the spacers are automatically displaced from the positions right over the elements. As a result, the effect by the charge-up of the spacers is relaxed, thereby suppressing effectively the off leakage current. This leads to effective suppression of the defective sustainment of voltage at the pixel electrodes.

Moreover, because of the protrusions, the spacers distributed in the gap are prevented from moving toward the switching elements even if vibration and/or shock is applied to the device.

In a preferred embodiment of the device according to the first aspect, the protrusions include an interlayer dielectric layer formed to cover the switching elements.

In another preferred embodiment of the device according to the first aspect, the protrusions include an overcoat layer formed on the second substrate.

In still another preferred embodiment of the device according to the first aspect, part of the protrusions includes an interlayer dielectric layer formed on the first substrate to cover the switching elements while remainder of the protrusion includes an overcoat layer formed on the second substrate.

It is preferred that each of the protrusions has a height less than a diameter of the spacers by approximately 1 μm or greater.

It is preferred that each of the protrusions has a slope that covers entirely a corresponding one of the switching elements.

The protrusions may be formed by a photosensitive organic layer, or by a two-layer structure of an inorganic dielectric layer and a photosensitive organic layer.

Preferably, the switching elements are of inverted-staggered type.

In a further preferred embodiment of the device according to the first aspect, each of the protrusions includes a recess that guides the spacer away from a corresponding one of the elements.

According to a second aspect of the invention, a method of fabricating the active-matrix addressing LCD device according to the first aspect is provided. This method comprises:

(a) providing a first substrate and a second substrate; the first substrate having switching elements; protrusion being formed on at least one of the first and second substrates; and (b) coupling the first and second substrates with each other in such a way as to form a gap with spacers between the first and second substrates;

the spacers being distributed in the gap;

a liquid crystal being confined in the gap;

wherein the protrusions are located in overlapping areas with the switching elements;

and wherein each of the protrusions is protruded in a direction that narrows the gap;

and wherein the spacers are moved away from the elements along slopes of the protrusions when or after the first and second substrates are coupled with each other.

With the method according to the second aspect of the invention, it is obvious that the active-matrix addressing LCD device according to the first aspect is fabricated.

In a preferred embodiment of the method according to the second aspect, a mask is used to form the protrusions. The mask comprises blocking regions that block exposing light or transparent regions that allow exposing light to penetrate. The blocking or transparent regions are formed at corresponding positions to the protrusions.

In another preferred embodiment of the method according to the second aspect, at least one of the first and second substrates has a photosensitive interlayer dielectric layer. A gray-tone mask is used to form the protrusions on the interlayer dielectric layer. The gray-tone mask comprises blocking/transparent regions formed at corresponding positions to the protrusions, transparent/blocking regions formed at corresponding positions to contact holes of the interlayer dielectric layer, and translucent regions formed at remaining positions.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
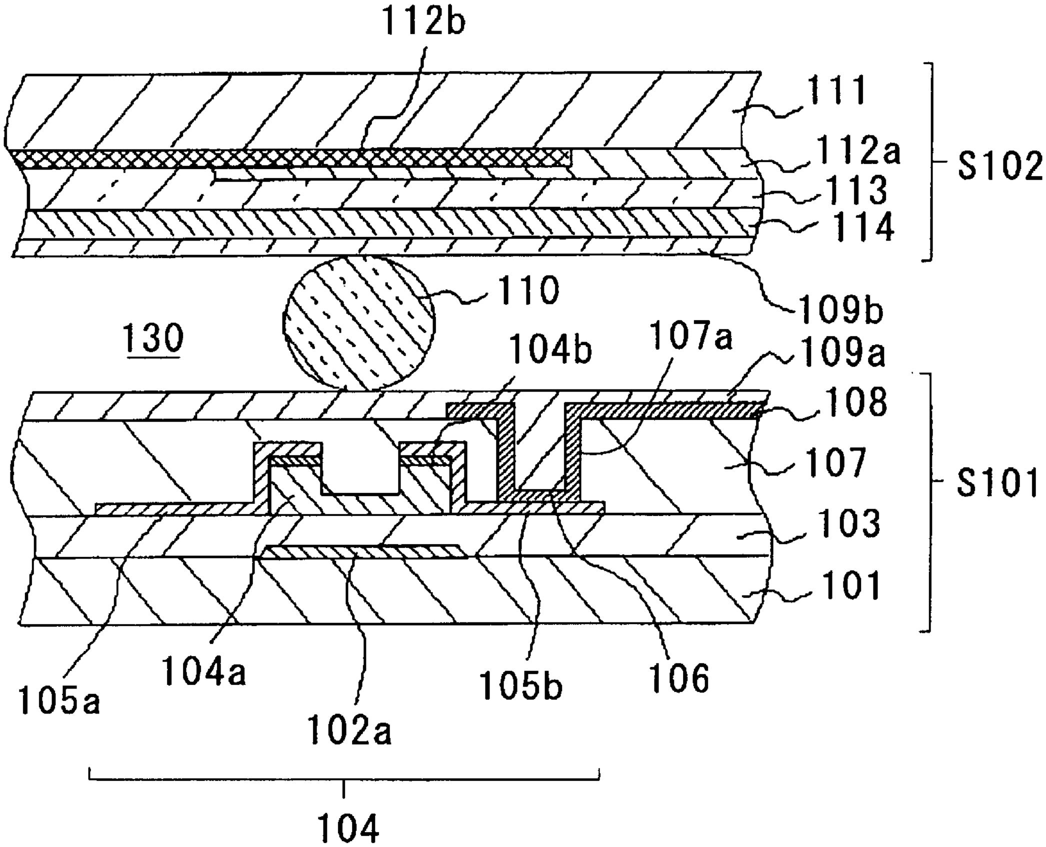
FIG. 1 is a partial, cross-sectional view showing the configuration of a prior-art active-matrix addressing LCD device.
Figure 2A:
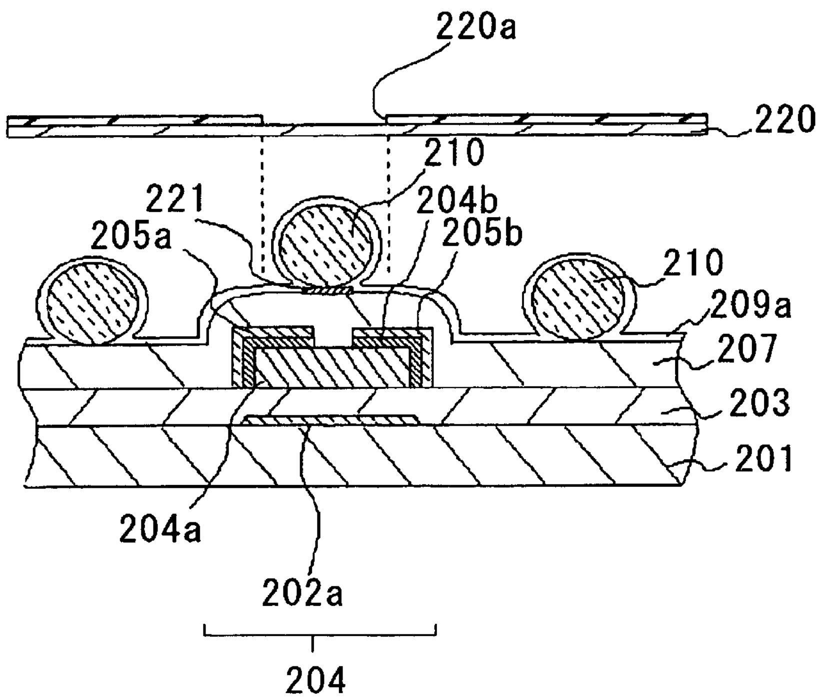
FIGS. 2A and 2B are partial, cross-sectional views showing a method of fabricating another prior-art active-matrix addressing LCD device, respectively.
Figure 2B:
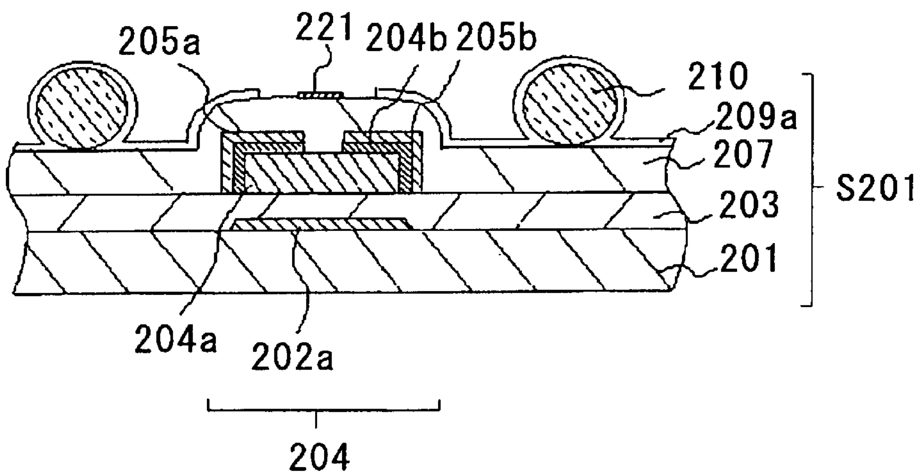
Figure 3:
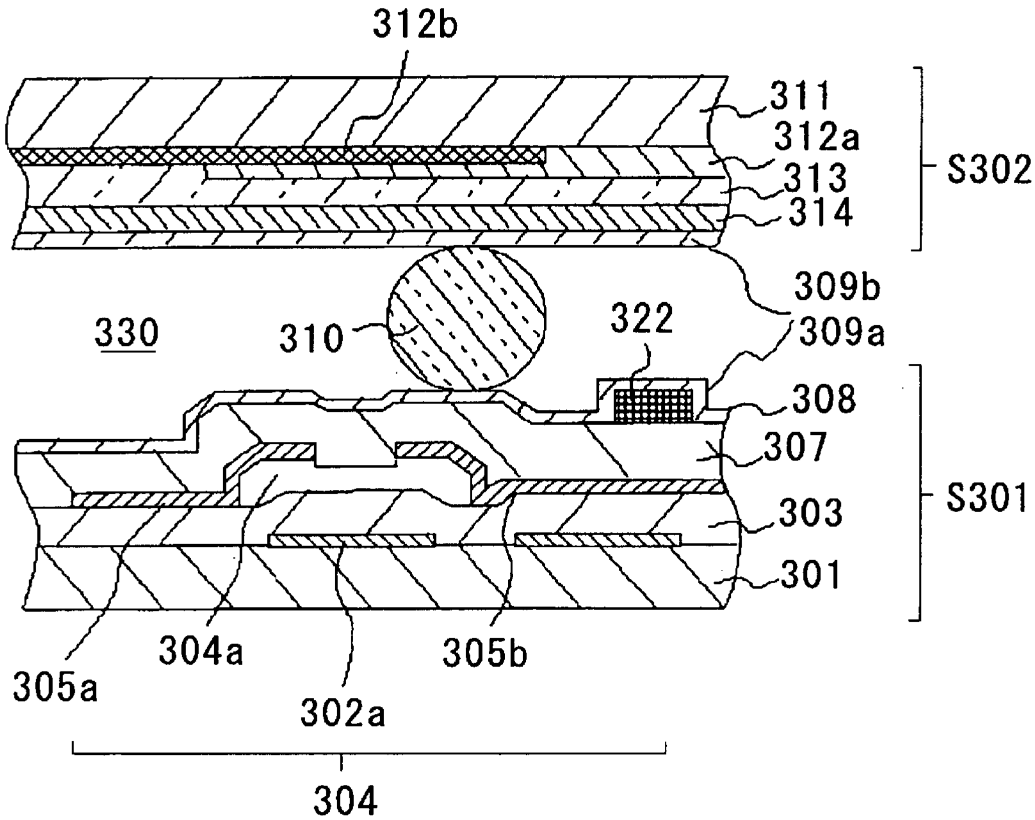
FIG. 3 is a partial, cross-sectional view showing the configuration of still another prior-art active-matrix addressing LCD device.

Preferred embodiments of the present invention will be described in detail below while referring to the drawings attached.

First Embodiment

Figure 4:
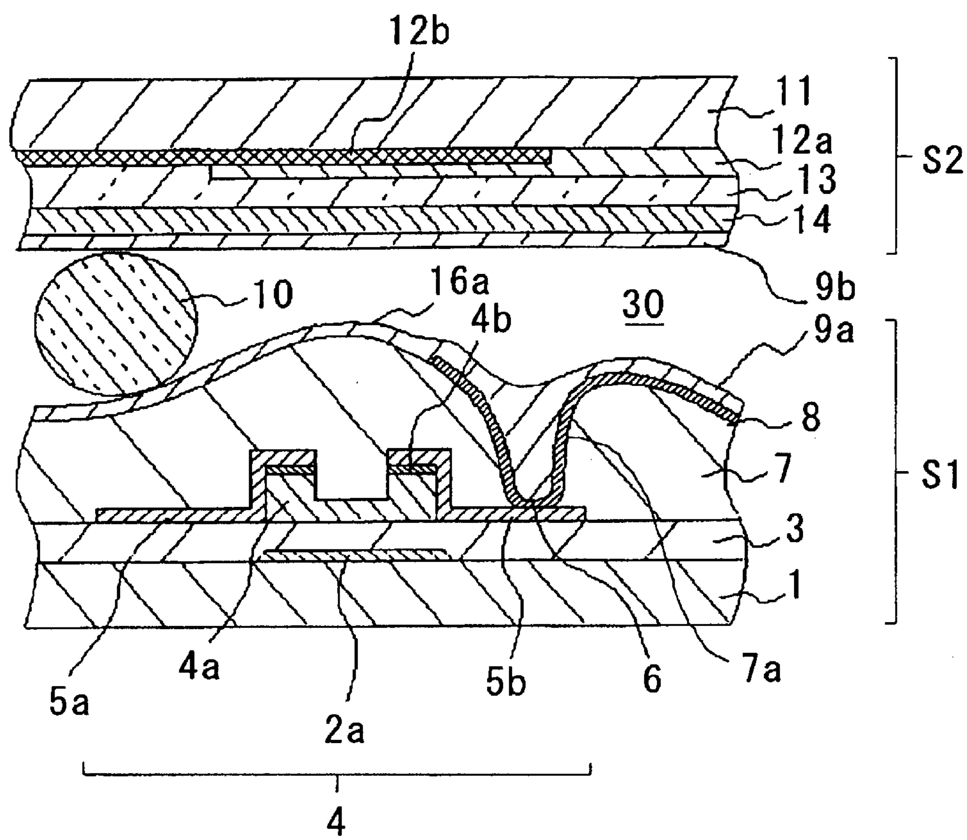
FIG. 4 is a partial, cross-sectional view showing the configuration of an active-matrix addressing LCD device according to a first embodiment of the invention, which is along the line IX—IX in FIG. 5.
Figure 5:
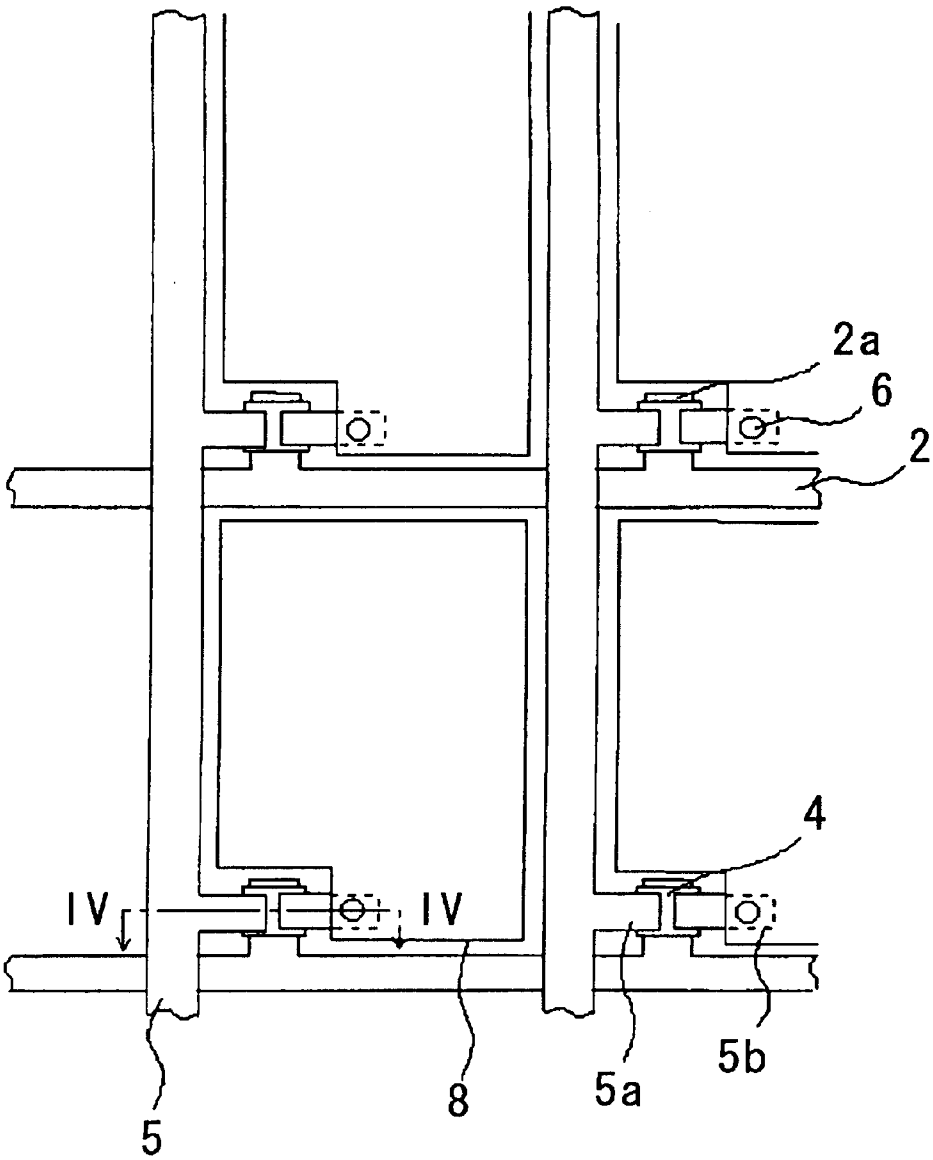
FIG. 5 is a partial plan view showing the layout of the TFTs, pixels, gate lines, and drain lines of the active-matrix addressing LCD device according to the first embodiment of FIG. 4.

FIGS. 4 and 5 show the structure of an active-matrix addressing LCD device according to a first embodiment of the invention. Needless to say, this device includes a lot of inverted-staggered type, channel-etched TFTs, spacers, and pixels. However, for the sake of simplification, one TFT, one spacer, and one pixel are shown in FIG. 4 and explained mainly below.

The active-matrix addressing LCD device of the first embodiment comprises an active-matrix substrate S1, an opposite substrate S2, and a liquid-crystal layer formed in a gap 30 between the substrates S1 and S2. The liquid-crystal layer is sandwiched by the substrates S1 and S2.

The active-matrix substrate S1 comprises a glass plate 1, a gate electrode 2*a,* a gate dielectric layer 3, an a-Si island 4*a,* a $n^+$-type a-Si contact 4*b,* a drain electrode 5*a,* and a source electrode 5*b*. The gate electrode 2*a,* the gate dielectric layer 3, the a-Si island 4*a,* the $n^+$-type a-Si contact 4*b,* and the drain and source electrodes 5*a* and 5*b* constitute a TFT 4 provided in each of the pixels. The combination of the island 4*a* and the contact 4*b* may be termed a TFT island.

The gate electrode 2*a* is formed on the surface of the plate 1. The gate dielectric layer 3 is formed on the surface of the plate 1 to cover the electrode 2*a*. The a-Si island 4*a* is formed on the gate dielectric layer 3 to overlap entirely with the gate electrode 2*a*.The $n^+$-type a-Si contact 4*b* is formed selectively on the island 4*a*. The drain electrode 5*a* and the source electrode 5*b* are formed on the gate dielectric layer 3 at each side of the island 4*a*. The inner end part of the drain electrode 5*a* is located on the a-Si contact 4*b* and contacted with the island 4*a* and the contact 4*b*. The inner end part of the source electrode 5*b* is located on the a-Si layer 4*b* and contacted with the island 4*a* and the contact 4*b*. The island 4*a* and the contact 4*b* are selectively etched to form a recess in the island 4*a* between the drain and source electrodes 4*a* and 4*b,* resulting in the channel-etched TFTs 4. A channel region is formed in the island 4*a* between the electrodes 4*a* and 4*b*.

The active-matrix substrate S1 further comprises an interlayer dielectric layer 7 formed to cover the TFT 4. The layer 7 has a protrusion 16*a* a at the position right over the TFT 4, thereby narrowing the gap at the position in question. The layer 7 is selectively removed to form a contact hole 7*a* that exposes the source electrode 5*b*. A pixel electrode 8, which is formed by patterning a transparent, conductive film such as an ITO film, is formed on the layer 7. The electrode 8 is contacted with the source electrode 6 by way of the hole 7*a* at a contact region 6.

An orientation layer 9*a* is formed on the interlayer dielectric layer 7 to cover the exposed pixel electrode 8. The layer 9*a* serves to align the orientation of the liquid-crystal molecules existing in the gap 30 in a specific direction.

As shown in FIG. 5, on the substrate S1, gate lines 2 are arranged at equal intervals in a direction (i.e., a horizontal direction in FIG. 5) while drain lines 5 are arranged at equal intervals in a direction (i.e., a vertical direction in FIG. 5) perpendicular to the lines 2. Each of the gate lines 2 is connected to the corresponding gate electrode 2*a*. Each of the drain lines 5 is connected to the corresponding drain electrode 5*a*. The TFTs 4 serving as switching elements are arranged near the respective intersections of the lines 2 and 5.

The opposite substrate S2 comprises a glass plate 11, a color filter 12*a,* a black matrix 12*b,* an overcoat layer 13, a transparent common electrode 14, and an orientation layer 9*b*. The color filter 12*a,* which is formed on the surface of the plate 11, a is used to display color images on the screen. The black matrix 12*b,* which is formed on the surface of the plate 11 also, is used to prevent external light from entering the TFTS 4 and the gate and drain lines 2 and 5 located on the active-matrix substrate S1. The overcoat layer 13 is formed to cover entirely the color filter 12*a* and the black matrix 12*b*. The common electrode 14, which is made of ITO, is formed on the layer 13. The orientation layer 9*b* is formed on the electrode 14. The layer 9*b* serves to align the orientation of the liquid-crystal molecules existing in the gap 30 in a specific direction.

The active-matrix substrate S1 and the opposite substrate S2 are coupled with each other with a sealing member (not shown) in such a way as to form the desired gap 30 between the substrates S1 and S2 with ball-shaped, rigid spacers 10. The spacers 10 are randomly distributed in the gap 30. A specific liquid crystal is filled into the gap 30 to thereby form the liquid crystal layer.

Next, a method of fabricating the above-described LCD device according to the first embodiment is explained below with reference to FIGS. 6A to 6E.

Figure 6A:
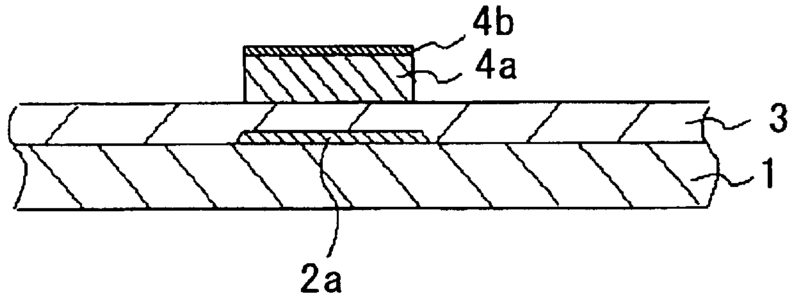
FIGS. 6A to 6E are schematic cross-sectional views along the line IV—IV in FIG. 5, which show a method of fabricating the device according to the first embodiment, respectively.

First, as shown in FIG. 6A, the TFT 4 is formed through popular processes. Concretely, a Cr layer with a thickness of 200 nm is deposited by a sputtering process on the surface of the glass plate 1 and then, it is patterned by popular lithography and etching techniques, thereby forming the gate electrode 2*a* and the gate lines 2 on the plate 11. Thereafter, as the gate dielectric layer 3, a silicon nitride layer with a thickness of approximately 500 nm is formed on the plate 1 to cover the electrode 2*a* by a Chemical Vapor Deposition (CVD) process. An a-Si layer with a thickness of about 300 nm and a $n^+$-type a-Si layer with a thickness of about 50 nm are successively deposited by a CVD process or processes and then, they are patterned by popular lithography and etching techniques, thereby forming the TFT island including the island 4*a* and the contact 4*b*. The state at this stage is shown in FIG. 6A.

Figure 6B:
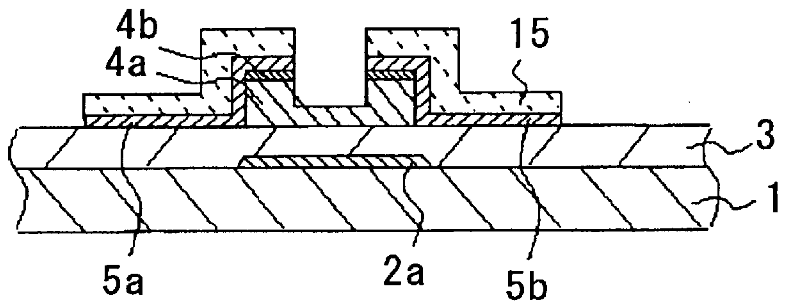

Subsequently, as shown in FIG. 6B, a Cr layer with a thickness of about 150 nm is deposited on the gate dielectric layer 3 by a sputtering process. A resist pattern 15 is formed on the Cr layer. Using the pattern 15 thus formed, the Cr layer is patterned by a dry etching process, thereby forming the drain and source electrodes 5*a* and 5*b* and the drain lines 5.

The a-Si island 4*a* and the $n^+$-type a-Si contact 4*a* are selectively etched by a dry etching process, thereby forming a recess exposing the channel section. This process, which is termed "channel etching", is carried out without removing the pattern 15. This channel etching process may be carried out under a condition that the flow rate of the etching gas is 500 sccm, the gas pressure is 20 Pa, and the RF (Radio Frequency) power is approximately 600 W. The depth of the recess is set at approximately 100 nm from the surface of the contact 4*b*. The resist pattern 15 is removed at this stage.

Figure 6C:
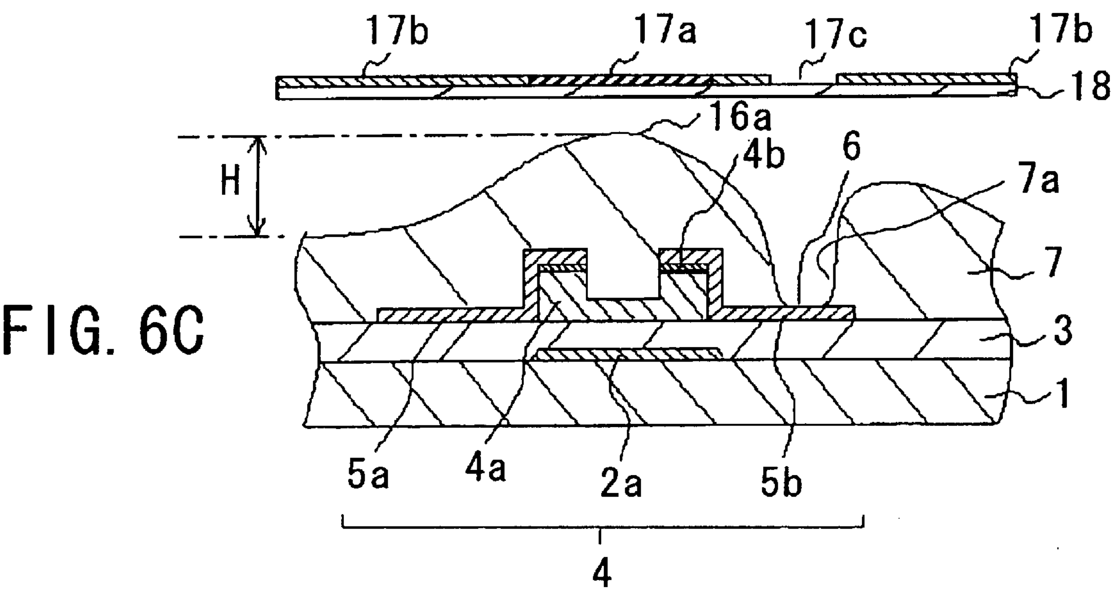

Thereafter, the interlayer dielectric layer 7 is formed on the whole surface of the glass plate 1 to cover the TFTs 4 by a spin coating process. In this embodiment, as shown in FIG. 6C, the conditions for the spin coating process (e.g., viscosity of the material, coating condition, and exposure condition) is determined in such a way that the layer 7 has a larger thickness at the positions right over the TFTs 4 than the remaining area. For example, a photosensitive acrylic resin with a viscosity of approximately 5 to 15 Pa·s is used as the source material and then, this resin is coated on the surface of the gate dielectric layer 3 and the TFTs 4 while rotating the plate 1 at a rate of 1000 to 2000 rpm for 10 to 20 sec. Thereafter, the photosensitive acrylic resin layer thus formed is sintered for about one hour at approximately 220° C. As a result, this resin layer finally has a thickness of approximately 1.5 to 3.5 μm. The photosensitive acrylic resin layer thus formed is used for the interlayer dielectric layer 7.

The photosensitive acrylic resin layer is selectively exposed to the GHI line as the exposing light with the use of a gray tone mask 18. The mask 18 has a blocking region 17*a,* a transparent region 17*c,* and a translucent region 17*b,* as shown in FIG. 6C. The blocking region 17*a,* which is located right over each of the TFTs 4, blocks the GHI line, The transparent region 17*c,* which is located right over each of the contact holes 7*a,* allows the GHI line to penetrate at full. The translucent region 17*c,* which covers the remaining area of the layer 3, allows the GHI line to penetrate at a lower transmission rate than the region 17*c*. As a result, when the layer thus exposed is developed with a proper developer solution, the TFT regions are not exposed and thus they are left unchanged. Since the areas for the contact holes 7*a* are sufficiently exposed, they are selectively removed to be the contact holes 7*a* that reach the respective source electrodes 5*b*. The remaining area is exposed at 4 low exposure rate and therefore, the thickness of the area is simply decreased.

Following this step, the photosensitive acrylic resin layer thus exposed and developed is subjected to a heat treatment process at a specific temperature. Thus, the interlayer dielectric layer 7 with the protrusions 16*a* over the TFTs 4 is finally formed. Each of the protrusions 16*a* has a gentle slope, as shown in FIG. 6C.

If the interlayer dielectric layer 7 is too thick, the contact holes 7 are difficult to be formed, or the pixel electrodes 8 to be formed subsequently are likely to be broken or disconnected. If the interlayer dielectric layer 7 is too thin, the desired protrusions 16*a* with the gentle slopes are unable to be formed. Thus, in this case, there arises the need to adjust the thickness of the photosensitive acrylic resin layer and the height H of the protrusions 16*a*. According to the test conducted by the inventors, it was found that the desired protrusions 16*a* that move the spacers 10 away from the TFTs 4 are formed when the height H is less than the diameter of the spacers 10 by a difference of approximately 1 μm or greater. Moreover, it was found that if the slopes of the protrusions 16*a* are formed to reach the ends of the source and drain electrodes 5*a* and 5*b,* the effect by the charge-up of the spacers 10 is suppressed to an allowable level.

In this embodiment, the protrusions 16*a* and the contact holes 7*a* of the layer 7 are formed through a single exposure process using the gray tone mask 18. However the invention is not limited to this. They may be formed through two exposure processes. For example, the part of the photosensitive acrylic resin layer other than the TFT regions is exposed to the GHI line in the first exposure process and then, the part corresponding to the contact holes 7*a* is exposed to the GHI line to a level sufficient for forming the holes 7*a* in the second exposure process.

Figure 6D:
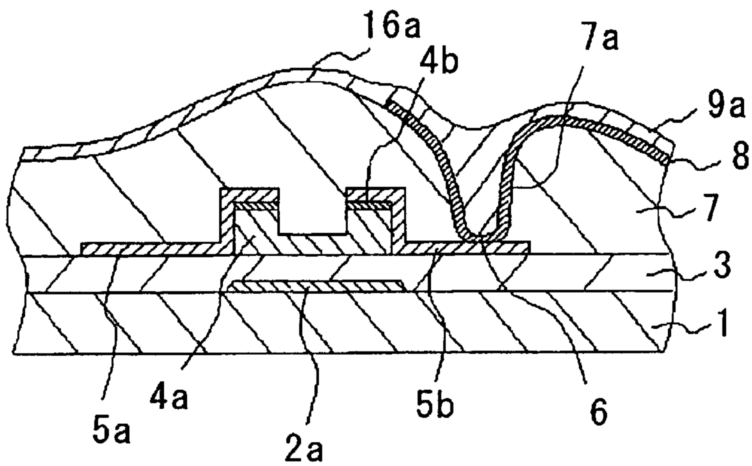
Figure 6E:
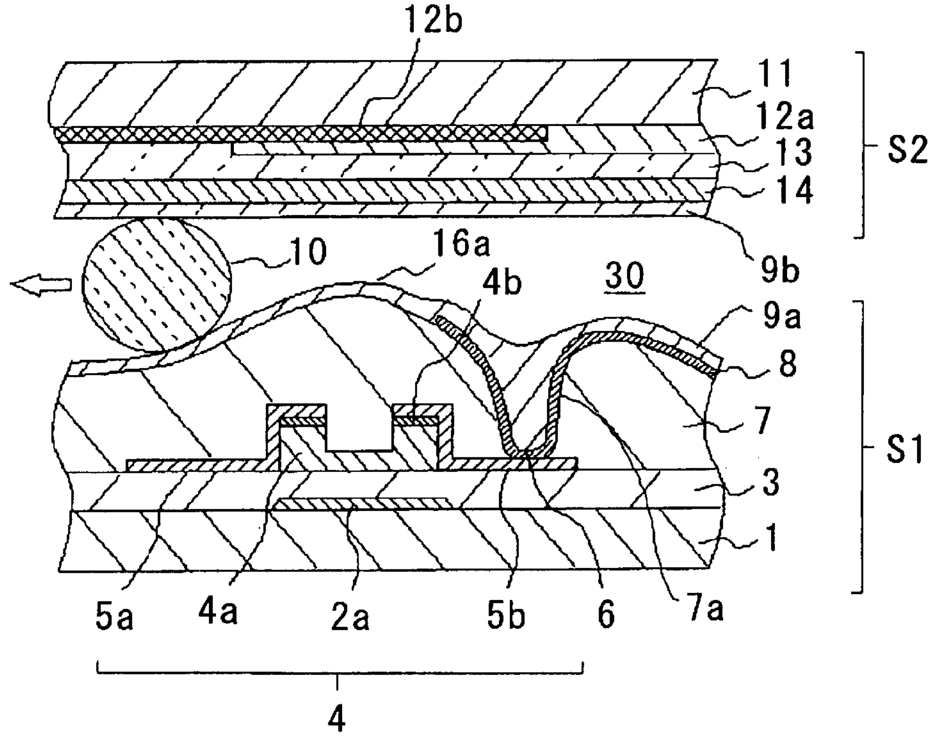

Subsequently, a transparent, conductive layer (e.g., ITO layer) with a thickness of about 40 nm is formed on the interlayer dielectric layer 7 and patterned. Thus, as shown in FIG. 6D, the pixel electrodes 8 are formed in such a way as to contact the respective source electrodes 5*b* at the corresponding contact regions 6.

The orientation layer 9*a* is formed on the interlayer dielectric layer 7 to cover the pixel electrodes 8. The layer 9*a* is subjected to a specific orientation process.

On the other hand, the opposite substrate S2 is formed in the following way. Specifically, the color filter 12*a* is formed on the glass plate 11 to correspond to the respective pixels. The black matrix 12*b* is formed to correspond to the TFTs 4 and the gate and drain lines 2 and 5. The overcoat layer 13 is formed to cover the filter 12*a* and the matrix 12*b*. The transparent common electrode 14 is formed on the layer 13. The orientation layer 9*b* is formed to cover the electrode 14 by a coating process. The layer 9*b* is then subjected to a specific orientation process.

The spacers 10, which are inorganic small particles whose diameter is 4 to 5 μm, are distributed randomly on the inner surface of the active-matrix or opposite substrate S1 or S2. Then, the substrate S1 and S2 are coupled with each other in such a way as to form the gap 30. The gap 30 is defined by a sealing member (not shown). At this stage, the ball-shaped spacers 10 are randomly dispersed in the whole gap 30 and therefore, some of the spacers 10 may be placed right over the TFTs 4. However, the substrate S1 has the protrusions 16*a* on its inner surface. Therefore, the spacers 10 are likely to move coward the wider-gap areas (which is designated by the arrow in FIG. 6E) along the slopes of the protrusions 16*a*. In other words, the spacers 10 are naturally displaced from the positions right over the TFTs 4.

Finally, the liquid crystal is injected into the gap 30 and then, the gap 20 is sealed by known processes. Thus, the active-matrix addressing LCD device according to the first embodiment of FIGS. 4 and 5 is fabricated.

With the active-matrix addressing LCD device according to the first embodiment, as explained above, the protrusions 16*a* are formed on the active-matrix substrate S1 in the overlapping areas with the TFTs 4 as the switching elements. Each of the protrusions 16*a* is protruded in the direction that narrows the gap 30 (i.e., protruded perpendicular to the substrate S1).

Therefore, when or after the active-matrix and opposite substrates S1 and S2 are coupled with each other to form the gap 30 therebetween, the ball-shaped spacers 10 distributed in the gap 30 are naturally shifted away from the overlapping areas. This means that the spacers 10 are automatically displaced from the positions right over the TFTs 4. As a result, the effect by the charge-up of the spacers 10 is relaxed, thereby suppressing effectively the off leakage current. This leads to effective suppression of the defective sustainment of voltage at the pixel electrodes 8.

Moreover, because of the protrusions 16*a,* the spacers 10 distributed in the gap 30 are prevented from moving toward the TFTs 4 even if vibration and/or shock is applied to the device.

Second Embodiment

The above-described LCD device of the first embodiment comprises the channel-etched TFTs 4 of the inverted staggered type. However, the invention may be applied any other type of TFTs, such as channel-protected TFTs and staggered type TFTs.

Figure 7:
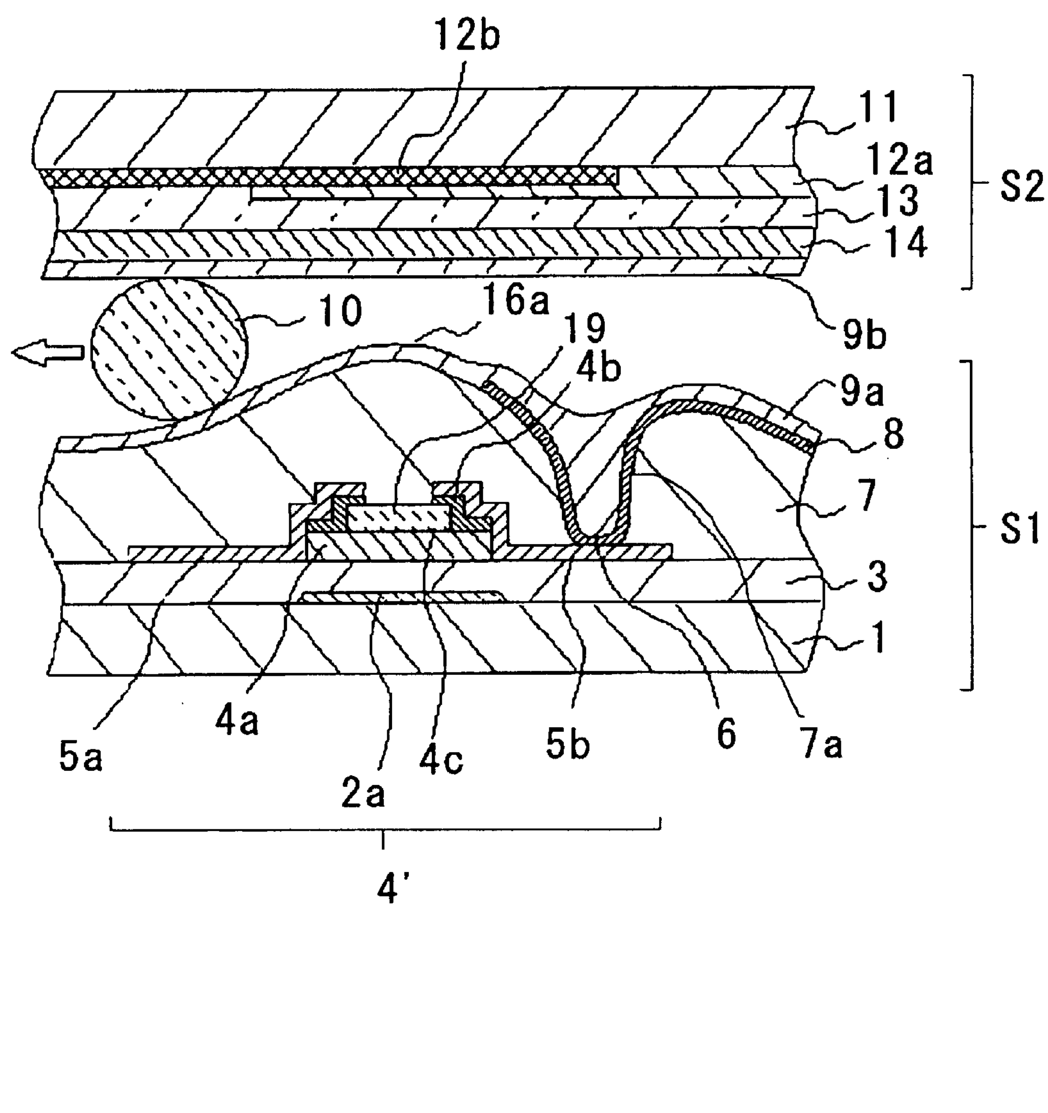
FIG. 7 is a partial, cross-sectional view showing the configuration of an active-matrix addressing LCD device according to a second embodiment of the invention, which is along the line IX—IX in FIG. 5.

FIG. 7 shows the structure of an active-matrix addressing LCD device according to a second embodiment of the invention, in which channel-protected, inverted-staggered type TFTs 4' are used. The other structure is the same as the device of the first embodiment.

Unlike the first embodiment, the a-Si island 4*a* is not etched. Instead, the island 4*a* is covered with a protection layer 19. The $n^+$-type a-Si contact 4*b* is located on the island 4*a* and the layer 19. The inner end parts of the drain and source electrodes 5*a* and 5*b* are located on the contact 4*b*.

It is obvious that the LCD device of the second embodiment has the same advantages as those of the first embodiment.

Third Embodiment

Figure 8:
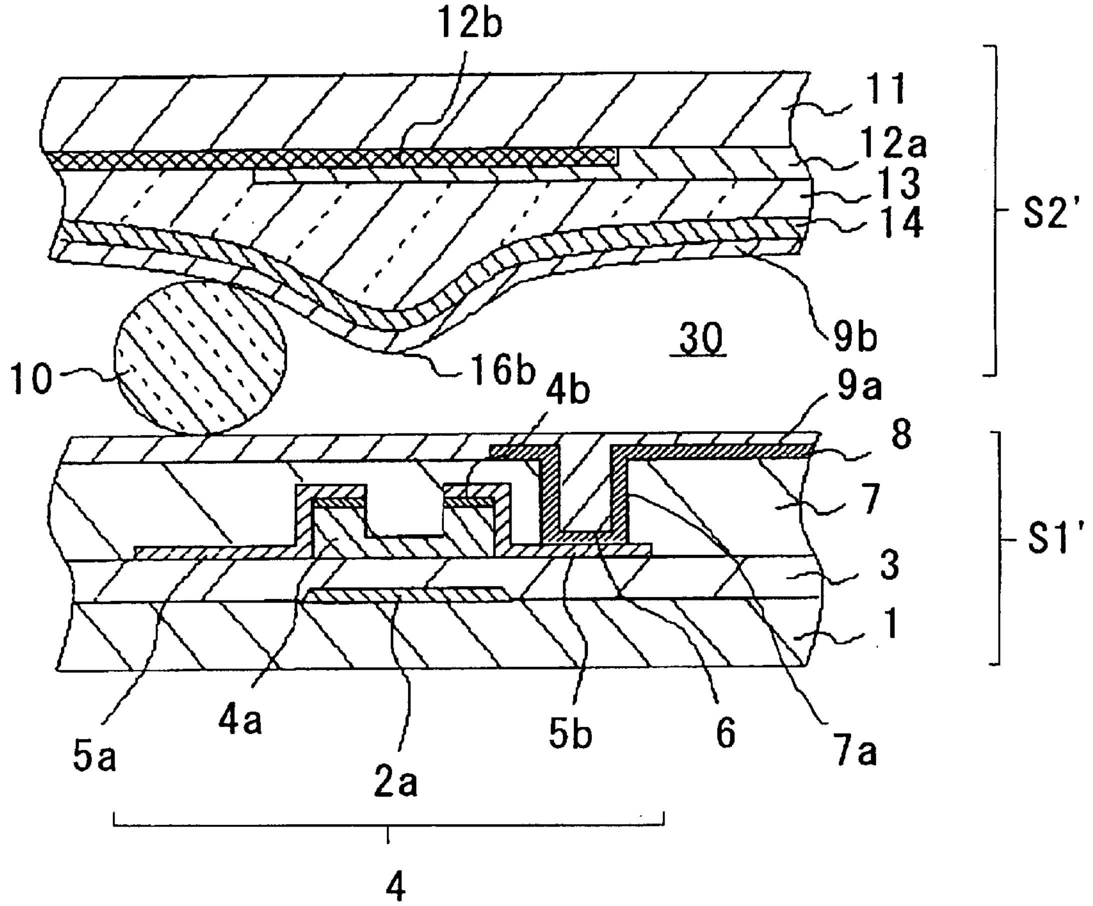
FIG. 8 is a partial, cross-sectional view showing the configuration of an active-matrix addressing LCD device according to a third embodiment of the invention, which is along the line IX—IX in FIG. 5.

FIG. 8 shows the structure of an active-matrix addressing LCD device according to a third embodiment of the invention, in which protrusions 16*b* are formed on an opposite substrate S2' while no protrusions are formed on an active-matrix substrate S1'.

The structure of the active-matrix substrate S1' is the sane as the active-matrix substrate S1 of the first embodiment, except that the surface of the interlayer dielectric layer 7 is planarized. Therefore, the explanation of the substrate S1' is omitted here by attaching the same reference symbols as those used in the first embodiment.

The structure of the opposite substrate S2' is the same as the opposite substrate S2 of the first embodiment, except that the protrusions 16*b* are formed on the surface of the overcoat layer 13. Therefore, the explanation of the substrate S2' is omitted here by attaching the same reference symbols as those used in the first embodiment.

The protrusions 16*b* of the overcoat layer 13 are located at the opposing positions to the respective TFTs 4 on the substrate S1'.

With the LCD device of the third embodiment, the protrusions 16*b* are provided of the substrate S2' instead of the substrate S1'. Therefore, the device of the third embodiment has the same advantages as those of the first embodiment because of substantially the same reason as the first embodiment.

Next, a method of fabricating the LCD device of the third embodiment is explained below with reference to FIGS. 9A to 9F.

Figure 9A:
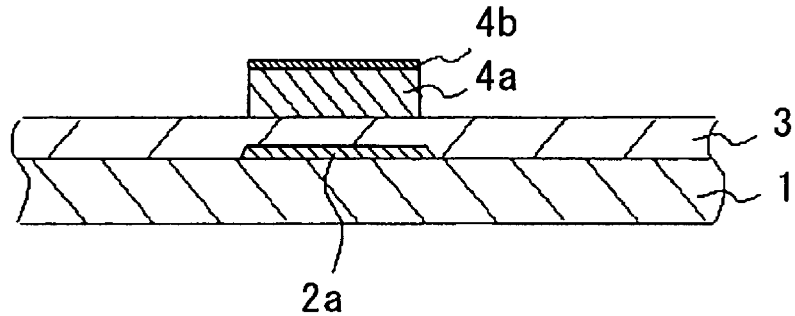
FIGS. 9A to 9F are schematic cross-sectional views along the line IV—IV in FIG. 5, which show a method of fabricating the device according to the third embodiment of FIG. 8, respectively.
Figure 9B:
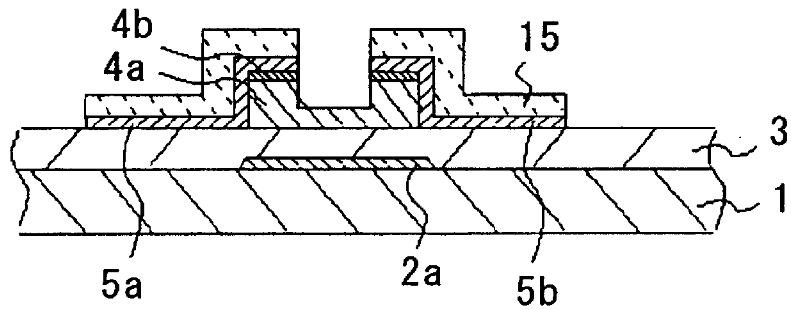
Figure 9C:
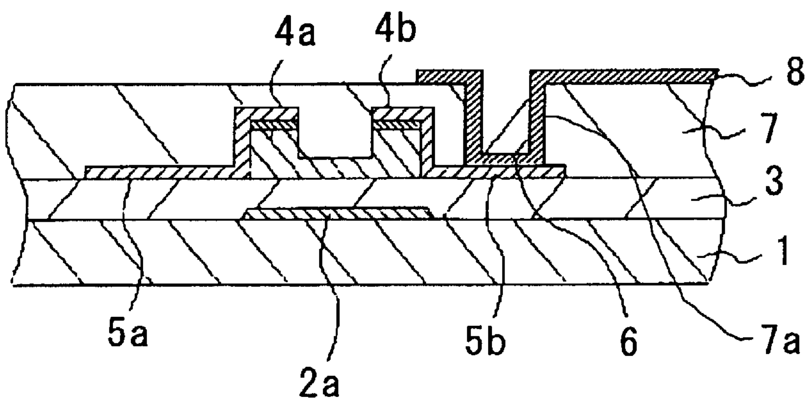

The steps of forming the active-matrix substrate S1' shown in FIGS. 9A to 9C are the same as those of the first embodiment, except that the interlayer dielectric layer 7 does not have the protrusions 16*a*. The surface of the layer 7 is planarized.

Figure 9D:
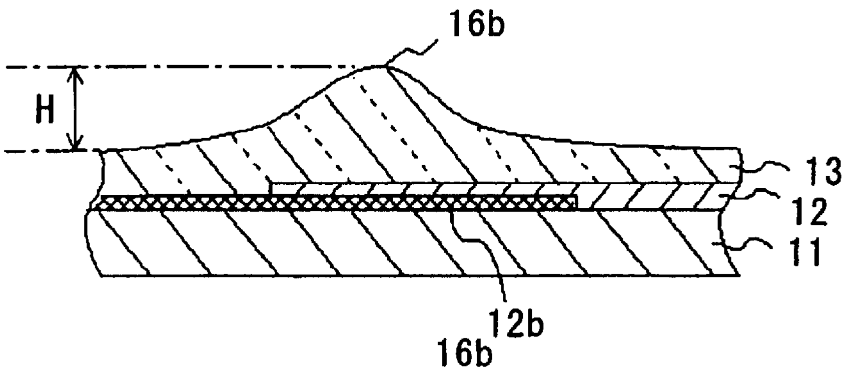
Figure 9E:
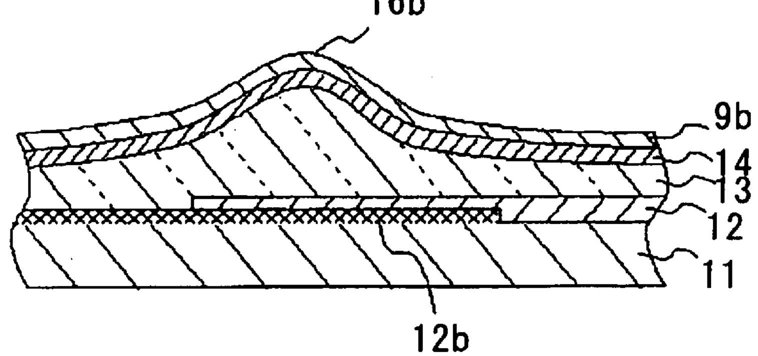
Figure 9F:
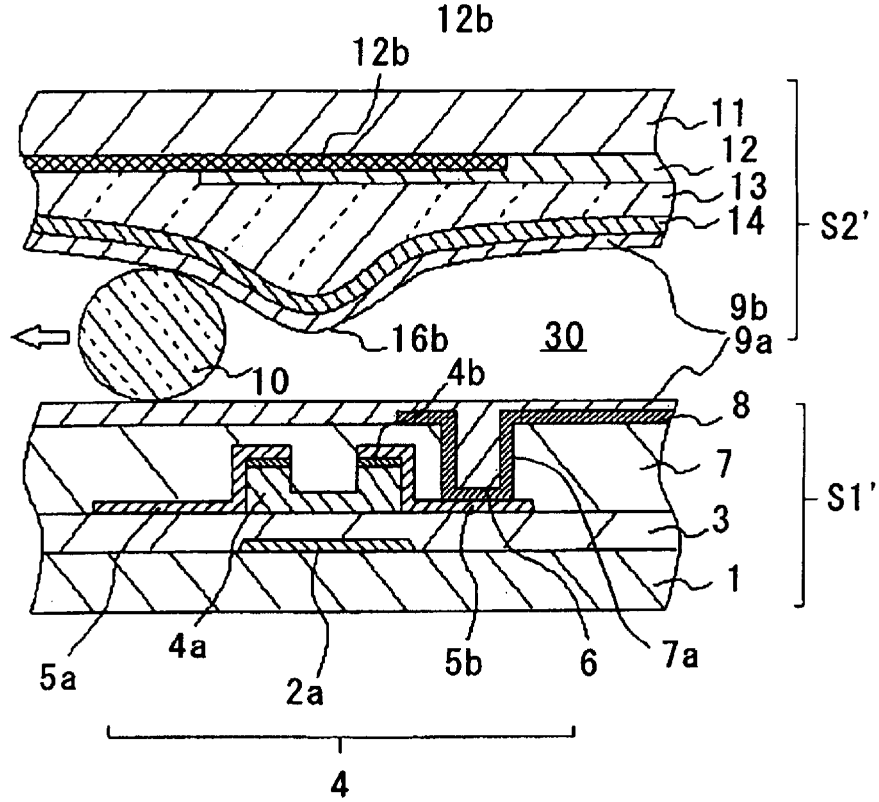

The steps of forming the opposite substrate S2' shown in FIGS. 9D and 9E are the same as those of the first embodiment, except that the overcoat layer 13 have the protrusions 16*b*.

Specifically, the color filter 12*a* is formed on the glass plate 11 to correspond to the respective pixels. The black matrix 12*b* is formed to correspond to the TFTs 4 and the gate and drain lines 2 and 5. Then, the overcoat layer 13 is formed to cover the filter 12*a* and the matrix 12*b* in the following way.

The overcoat layer 13 is formed over the whole surface of the glass plate 11 by a spin coating process. In this embodiment, as shown in FIG. 9D, the conditions for the spin coating process (e g., viscosity of the material, coating condition, and exposure condition) is determined in such a way that the layer 13 has a larger thickness at the positions opposite to the TFTs 4 than the remaining area. For example, a photosensitive acrylic resin (Or, a photosensitive epoxy resin) with a proper viscosity is used as the source material and then, this resin is coated to cover the color filter 12*a* and the black matrix 12*b* while rotating the plate 11 at a proper rate. Thereafter, the photosensitive acrylic resin layer thus formed is sintered for a proper period at a proper temperature. As a result, the photosensitive acrylic resin layer thus formed is used for the overcoat layer 13.

Thereafter, the photosensitive acrylic resin layer is selectively exposed to the GHI line as the exposing light with the use of a gray tone mask (not shown) similar to the mask 18 used in the first embodiment, and then, it is developed. Then, the photosensitive acrylic resin layer thus exposed and developed is subjected to a heat treatment process at a specific temperature. Thus, the overcoat layer 13 with the protrusions 16*b* is finally formed. Each of the protrusions 16*b* has a gentle slope similar to the slopes of the protrusions 16*a,* as shown in FIG. 9D.

According to the inventor's test, it was found that the desired protrusions 16*b* that move the spacers 10 away from the TFTs 4 are formed when the height H is less than the diameter of the spacers 10 by a difference of approximately 1 $\mu$m or greater. Moreover, it was found that if the slopes of the protrusions 16*b* are formed to reach the ends of the source and drain electrodes 5*a* and 5*b,* the effect by the charge-up of the spacers 10 is suppressed to an allowable level.

In this embodiment, the protrusions 16*b* are formed through a single exposure process using the gray tone mask 18. Therefore, the protrusions 16*b* can be formed accurately and simply. However, needless to say, the protrusions 16*b* may be formed through two exposure processes.

Subsequently, the transparent common electrode 14 made of ITO is formed on the layer 13 and then, the orientation layer 9*b* is formed on the electrode 14 through the same processes as those in the first embodiment. The orientation layer 9*b* is then subjected to a specific orientation process.

The spacers 10, which are inorganic small particles whose diameter is 4 to 5 $\mu$m, are distributed randomly on the inner surface of the active-matrix or opposite substrate S1' or S2'. Then, the substrate S1' and S2' are coupled with each other in such a way as to form the gap 30. The gap 30 is defined by a sealing member (not shown) . At this stage, the ball-shaped spacers 10 are randomly dispersed in the whole gap 30 and therefore, some of the spacers 10 may be placed right over the TFTs 4. However, the substrate S2' has the protrusions 16*b* on its inner surface. Therefore, the spacers 10 are likely to move toward the wider-gap areas (which is designated by the arrow in FIG. 9F) along the slopes of the protrusions 16*b*. In other words, the spacers 10 are naturally displaced from the positions right over the TFTs 4.

Finally, the liquid crystal is injected into the gap 30 and then, the gap 30 is sealed. Thus, the active-matrix addressing LCD device according to the third embodiment is fabricated.

With the LCD device according to the third embodiment, as explained above, the protrusions 16*b* are formed in the opposing areas to the TFTs 4. Each of the protrusions 16*b* is protruded in the direction that narrows the gap 30.

Therefore, when or after the active-matrix and opposite substrates S1' and S2' are coupled with each other to form the gap 30 therebetween, the ball-shaped spacers 10 distributed in the gap 30 are naturally shifted away from the opposing areas to the TFTs 4. This means that the spacers 10 are automatically displaced from the positions right over the TFTs 4. As a result, the effect by the charge-up of the spacers 10 is relaxed, thereby suppressing effectively the off leakage current. This leads to effective suppression of the defective sustainment of voltage al the pixel electrodes 8.

Moreover, because of the protrusions 16*b*, the spacers 10 distributed in the gap 30 are prevented from moving toward the TFTs 4 even if vibration and/or shock is applied to the device.

Fourth Embodiment

Figure 10:
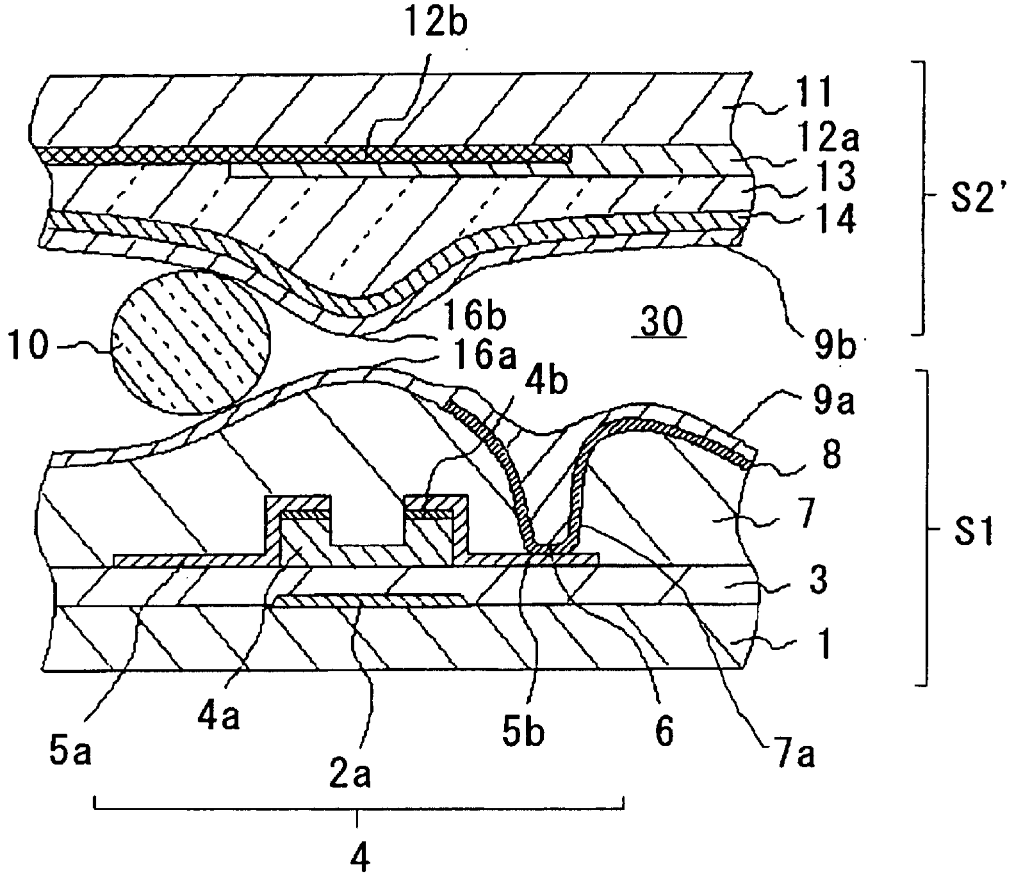
FIG. 10 is a partial, cross-sectional view showing the configuration of an active-matrix addressing LCD device according to a fourth embodiment of the invention, which is along the line IX—IX in FIG. 5.

FIG. 10 shows the structure of an active-matrix addressing LCD device according to a fourth embodiment of the invention, in which the active-matrix substrate S1 used in the first embodiment and the opposite substrate S2' used in the third embodiment are used. In other words, the device includes both the protrusions 16*a* on the substrate S1 shown, in FIG. 4 and the protrusions 16*b* on the substrate S2' shown in FIG. 8.

It is obvious that the LCD device of the fourth embodiment has the same advantages as those of the first embodiment. Moreover, since the value of the gap 30 varies within a range twice as much as the first or third embodiment, the obtainable advantages are enhanced.

Fifth Embodiment

Figure 11:
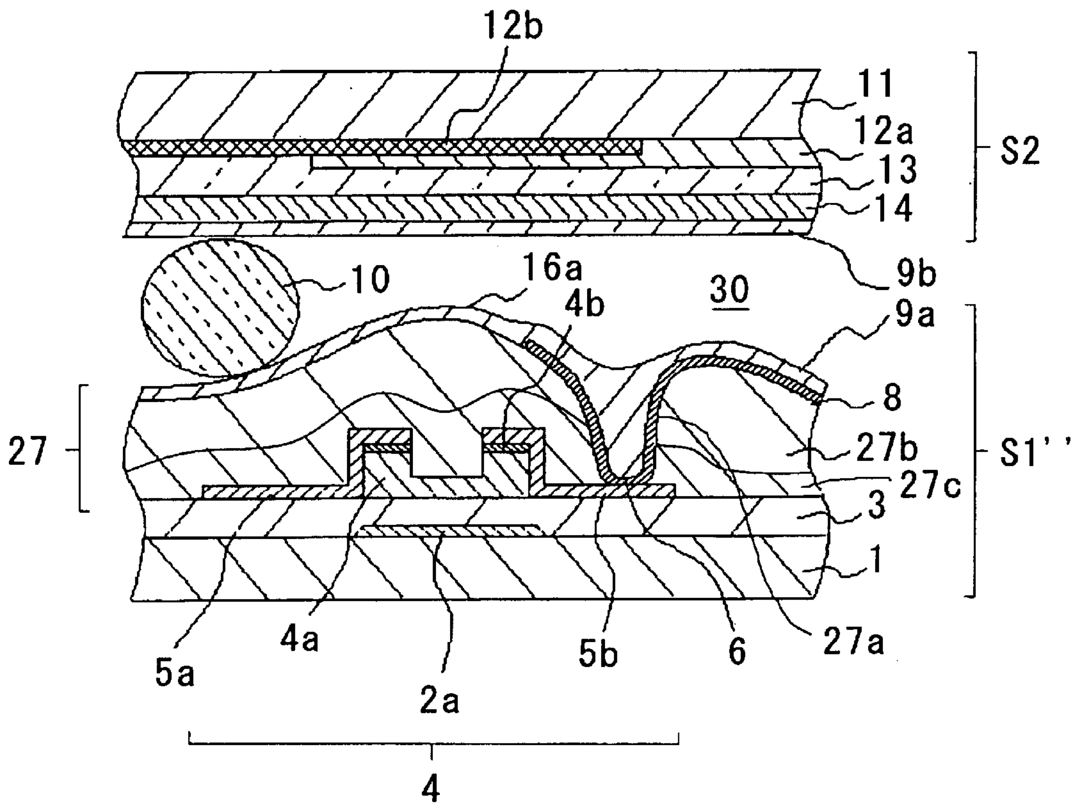
FIG. 11 is a partial, cross-sectional view showing the configuration of an active-matrix addressing LCD device according to a fifth embodiment of the invention, which is along the line IX—IX in FIG. 5.

FIG. 11 shows the structure of an active-matrix addressing LCD device according to a fifth embodiment of the invention, in which an active-matrix substrate S1" is provided instead of the substrate S1 used in the first embodiment. The other structure is the same as the first embodiment of FIG. 4.

The substrate S1" has the same structure as the substrate S1 of the first embodiment, except that an interlayer dielectric layer 27 with a two-layer structure is used. The layer 27 is formed by an inorganic sublayer 27*a* (e.g., a silicon nitride sublayer) and a photosensitive organic sublayer 27*b* (e.g., a photosensitive acrylic resin sublayer).

It is obvious that the LCD device of the fifth embodiment has the same advantages as those of the first embodiment.

Sixth Embodiment

Figure 12:
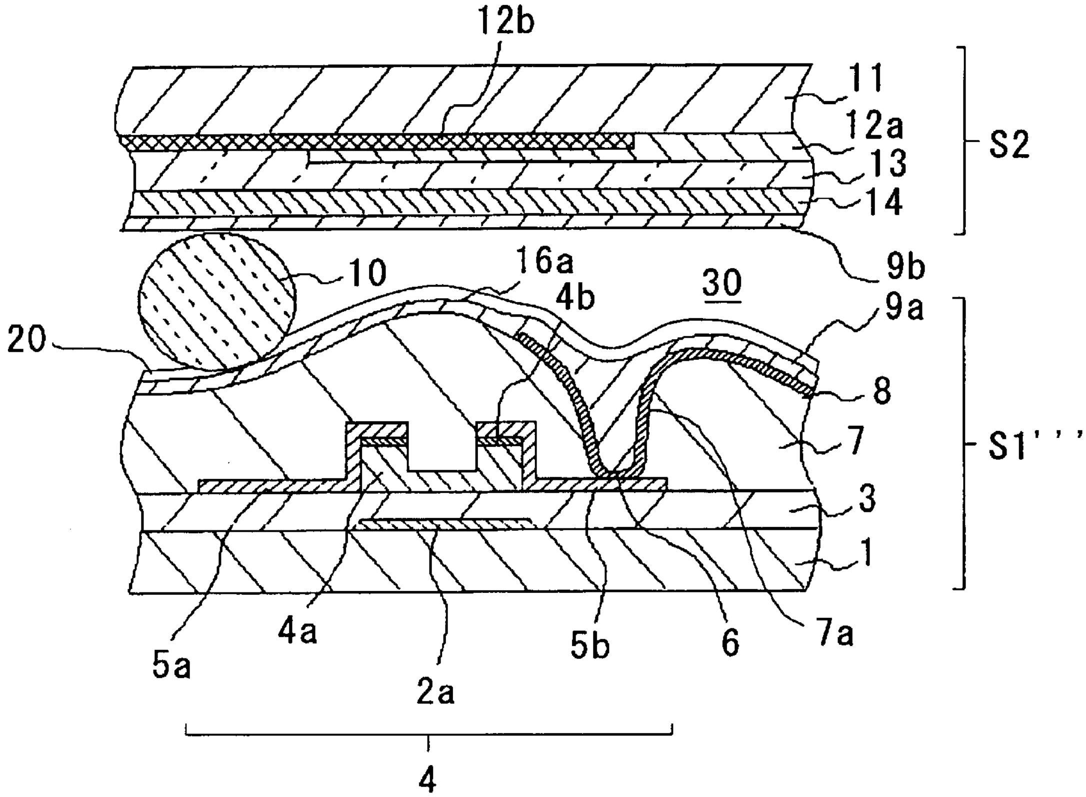
FIG. 12 is a partial, cross-sectional view showing the configuration of an active-matrix addressing LCD device according to a sixth embodiment of the invention, which is along the line IX—IX in FIG. 5.

FIG. 12 shows the structure of an active-matrix addressing LCD device according to a sixth embodiment of the invention, in which an active-matrix substrate S1'" is provided instead of the substrate S1 used in the first embodiment. The other structure is the same as the first embodiment of FIG. 4.

The substrate S1'" has the same structure as the substrate S1 of the first embodiment, except that radially-extending recesses 20 are formed in the orientation layer 9*a*. Each of the recesses 20 has a narrower width and a smaller depth than the diameter of the spacer 10.

It is obvious that the LCD device of the fifth embodiment has the same advantages as those of the first embodiment. There is an additional advantage what the ball-shaped spacers 10 are more likely to move away from the TFTs 4 along the recesses 20 than the first embodiment. This is because each protrusion 16*a* includes the radial recesses 20 that guide the spacer 10 away from a corresponding one of the TFTs 4.

The recesses 20 may be formed on the surface of the interlayer dielectric layer 7 in such a way that recesses 20 are formed in the layer 9*a* as reflection of the recesses 20.

Variations

Needless to say, the present invention is not limited to the above-described embodiment. Any change or modification may be added to them within the spirit of the invention. For example, the color filler is located on the opposite substrate in the above-described embodiments. However, the color filter may be located on the active-matrix substrate, in which the so-called "CFonTFT structure" is employed.

Furthermore, TFTs are used as the switching element in the above-described embodiments. However, any other element or device may be used as the switching element.

While the preferred forms of the present invention have been described, it is to be understood that modifications will be apparent to those skilled in the art without departing from the spirit of the invention, the scope of the present invention, therefore, is to be determined solely by the following claims.

What is claimed is:

1. An active-matrix addressing LCD device comprising:

(a) a first substrate having switching elements, wherein said first substate includes a source electrode, a $n^+$-type contact and and a-Si island, (b) a second substrate coupled with the first substrate in such a way as to form a gap with spacers between the first and second substrates, the spacers being distributed in the gap;

(c) a liquid crystal confined in the gap; and (d) a plurality of protrusions formed in overlapping areas with the switching elements, each of the protrusions being protruded in a direction that narrows the gap, wherein said source electrode partially covers a side of said $n^+$-type contact facing said second substrate and said a-Si island.

2. The device according to claim 1, wherein the protrusions include an interlayer dielectric layer formed to cover the switching elements.

3. The device according to claim 1, wherein the protrusions include an overcoat layer formed on the second substrate.

4. The device according to claim 1, wherein part of the protrusions includes an interlayer dielectric layer formed on the first substrate to cover the switching elements while remainder of the protrusions includes an overcoat layer formed on the second substrate.

5. An active-matrix addressing LCD device comprising:

a) a first substrate having switching elements, wherein said first substrate includes a source electrode, a $n^+$-type contact and an a-Si island;

b) a second substrate coupled with the first substrate in such a way as to form a gap with spacers between the first and second substrates, the spacers being distributed in the gap;

c) a liquid crystal confined in the gap; and d) a plurality of protrusions formed in overlapping areas with the switching elements, each of the protrusions being protruded in a direction that narrows the gap, wherein each of the protrusions has a maximum height less than a diameter of the spacers by approximately 1 $\mu$m or greater.

6. The device according to claim 1, wherein each of the protrusions has a slope that covers entirely a corresponding one of the switching elements.

7. The device according to claim 1, wherein the protrusions are formed by a photosensitive organic layer.

8. The device according to claim 1, wherein the protrusions are formed by a two-layer structure of an inorganic dielectric layer and a photosensitive organic layer.

9. The device according to claim 1, wherein each of the protrusions includes a recess that guides the spacer away from a corresponding one of the elements.

10. The device according to claim 1, wherein the switching elements are of inverted-staggered type.

11. An active-matrix addressing LCD device comprising:

(a) a first substate having switching elements;

(b) a second substrate coupled with the first substrate in such a way as to form a gap with spacers between the first and second substrates, the spacers being distributed in the gap;

(c) a liquid crystal confined in the gap; and (d) a plurality of protrusions formed in overlapping areas with the switching elements, each of the protrusions (i) being protruded in a direction that narrows the gap, and (ii) serving to shift the spacers away from said overlapping areas in spite of unwanted vibrations and/or shocks applied thereto.

12. The device according to claim 11, wherein the protrusions include an interlayer dielectric layer formed to cover the switching elements.

13. The device according to claim 11, wherein the switching elements are of inverted-staggered type.

14. An active-matrix addressing LCD device comprising:

(a) a first substrate having switching elements;

(b) a second substrate soupled with the first substrate in such a way as to form a gap with spacers between the first and second substrates, the spacers being distributed in the gap;

(c) a liquid crystal confined in the gap; and (d) a plurality of protrusions formed in overlapping areas with the switching elements, each of the protrusions (i) being protruded in a direction that narrows the gap, and (ii) serving to shift the spacers away from said overlapping areas, wherein each of the protrusions has a height less than a diameter of the spacers by approximately 1 $\mu$m or greater.

* * * * *

UNITED STATES PATENT AND TRADEMARK OFFICE

CERTIFICATE OF CORRECTION

PATENT NO. : 6,972,821 B2
APPLICATION NO. : 10/144630
DATED : December 6, 2005
INVENTOR(S) : Yasuda et al.

It is certified that error appears in the above-identified patent and that said Letters Patent is hereby corrected as shown below:

Claim 1, Col. 14, line 21, “contact and and a-Si” should be --contact and an a-Si--.
Claim 14, Col. 16, line 6, “substrate soupled with” should be --substrate coupled with--.

Signed and Sealed this

Twenty-fifth Day of August, 2009

David J. Kappos
*Director of the United States Patent and Trademark Office*